(12) United States Patent
Hammar (10) Patent No.: US 10,894,700 B2
(45) Date of Patent: Jan. 19, 2021

(54) SUPPORT STRUCTURE FOR A VEHICLE WITH A CARGO CRANE

(71) Applicant: Hammar Maskin IP AB, Olsfors (SE)

(72) Inventor: Bengt-Olof Hammar, Olsfors (SE)

(73) Assignee: Hammar Maskin IP AB, Olsfors (SE)

( * ) Notice: Subject to any disclaimer, the term of this patent is extended or adjusted under 35 U.S.C. 154(b) by 59 days.

(21) Appl. No.: 16/465,293

(22) PCT Filed: Nov. 28, 2017

(86) PCT No.: PCT/EP2017/080719
§ 371 (c)(1),
(2) Date: May 30, 2019

(87) PCT Pub. No.: WO2018/099929
PCT Pub. Date: Jun. 7, 2018

(65) Prior Publication Data
US 2019/0389701 A1    Dec. 26, 2019

(30) Foreign Application Priority Data

Dec. 1, 2016   (EP) .................................... 16201794

(51) Int. Cl.
*B60S 9/10*      (2006.01)
*B66C 23/80*     (2006.01)
(Continued)

(52) U.S. Cl.
CPC ............... *B66C 23/80* (2013.01); *B60S 9/10* (2013.01); *B60P 1/54* (2013.01); *B60P 1/6472* (2013.01)

(58) Field of Classification Search
CPC .... B66C 23/80; B60S 9/10; B60P 1/54; B60P 1/6472
See application file for complete search history.

(56) References Cited

U.S. PATENT DOCUMENTS

| 4,265,326 | A  | * | 5/1981  | Lauber  | B60F 5/00 180/8.3 |
| 10,221,541 | B1 | * | 3/2019  | Colbert | E02F 3/964 |
| 2015/0376865 | A1 | * | 12/2015 | McKee   | E02F 9/085 701/49 |

FOREIGN PATENT DOCUMENTS

GB    1234961 A     6/1971
WO    2012045812 A1 4/2012

OTHER PUBLICATIONS

International Search Report and Written Opinion of PCT Application No. PCT/EP2017/080719, dated Feb. 9, 2018 in 9 pages.

* cited by examiner

*Primary Examiner* — Bryan A Evans
(74) *Attorney, Agent, or Firm* — Knobbe, Martens, Olson & Bear, LLP (57) ABSTRACT

The present invention relates to a support structure for a vehicle provided with a cargo crane having a crane base, said support structure comprising a support beam connectable to said crane base and a support leg, wherein a proximal end of said support leg is connected to said support beam at a pivoting point, such that, said support leg is pivotable around said pivoting point relative to said support beam. The support structure further comprises an actuating device connected to the support leg for pivoting said support leg relative to said support beam, wherein said actuating device is configured to arrange said support structure in at least a tunnel mode and a diagonal mode, by adjusting an extension of said actuating device, such that in the tunnel mode, a distal end of said support leg is positioned to abut against a supporting surface on which the vehicle stands and in the diagonal mode, a knee of the support structure or at least a part of a lateral side of said support leg is positioned to abut against the supporting surface on which the vehicle stands.

14 Claims, 5 Drawing Sheets

(51) Int. Cl.
*B60P 1/54* (2006.01)
*B60P 1/64* (2006.01)

SUPPORT STRUCTURE FOR A VEHICLE WITH A CARGO CRANE

CROSS-REFERENCE TO RELATED APPLICATIONS

This application is the U.S. National Phase under 35. U.S.C. § 371 of International Application PCT/EP2017/080719, filed Nov. 28, 2017, which claims priority to European Patent Application No. 16201794.1, filed Dec. 1, 2016. The disclosures of the above-described applications are hereby incorporated by reference in their entirety.

TECHNICAL FIELD OF THE INVENTION

The present invention relates to a support structure for a vehicle provided with a cargo crane. The invention also relates to a vehicle having such a support structure.

BACKGROUND OF THE INVENTION

It is common to transport freight containers at least a part of a distance on roads using trucks having trailers specifically designed for this purpose. The containers are also called ISO containers or intermodal containers. The term "trailer" in and throughout this application is meant either one of full trailer, semi-trailer or on the truck itself. Also other vehicles can be used for these kinds of transportations such as train wagons. These vehicles usually have hydraulically powered lifting cranes to load and unload the containers from the ground, from another trailer or else. These are often referred to as "sidelifters". In order to stabilize the vehicle and container during a loading and unloading situation the trailer is also provided with hydraulically powered, foldable support structures such as stabilizing legs, which may be stored in a folded position in front of and behind the container when loaded onto the trailer. These support structures are when unfolded located on the same side of the trailer as the crane is. The crane arms are similarly stored in front of and behind the container on the trailer when not in use. Usually a trailer may be loaded with one or two 20 ft long containers or with a 40 ft long container. In order to achieve this at least one of the support structures and the crane arms are movable along the length of the trailer.

Certain types of support structures are positioned on the ground such that a second trailer may be positioned adjacent the first trailer to receive a container from the first one without touching the second trailer with the support structure. In this position the support structure also stands clear of the second trailer.

Other types of support structures exist. Such structures may be a type which in a folded position on the trailer is stored swung backwards such that a foot of a leg portion is pointing slightly upwards or at least located horizontally. When using the support structure, it is tilted around a hinge on the same side as the container is to be lifted resulting in a leg located inclined at an angle approx. 45 deg. from the ground towards the trailer. Such a support structure intervenes with the area in which another trailer may be located and may thus not always be used.

There is a need to improve the handling of these support structures. For instance, there is need to use these support structures also when there is not that much of space next to the vehicle and additionally there is a need for flexibility such that the support structures can be used for different purposes. There is also a need to improve the general design such that maneuverability is maintained or even improved while the support structure is better adapted for its purpose.

SUMMARY OF THE INVENTION

It is an object of the present invention to improve the current state of the art and to mitigate at least some of the above mentioned problems. These and other objects are achieved by a support structure for a vehicle.

According to a first aspect of the invention a support structure for a vehicle provided with a cargo crane having a crane base is provided. The support structure comprising:
a support beam connectable to said crane base said vehicle;
a support leg
wherein a proximal end of said support leg is connected to said support beam at a pivoting point, such that, said support leg is pivotable around said pivoting point relative to said support beam;
an actuating device connected to the support leg for pivoting said support leg relative to said support beam;
wherein said actuating device is configured to arrange said support structure in at least a tunnel mode and a diagonal mode, by adjusting an extension of said actuating device, such that:
in the tunnel mode, a distal end of said support leg is positioned to abut against a supporting surface on which the vehicle stands; and
in the diagonal mode, a knee of the support leg structure or at least a part of a lateral side of said support leg is positioned to abut against the supporting surface on which the vehicle stands.

The present invention is based on the realization that a support structure may have two different abutment surfaces to choose from for abutting, for instance, a ground surface. The invention is also based on the realization that one of said abutment surfaces may be at a knee of the support structure, whereby the support structure extends from the vehicle a shorter distance in the lateral direction than if supported by a distal end of the support structure. This allows the support structure to be used even though the space is limited, such as in a narrow street. The invention also encompasses embodiments in which a support structure can be arranged in one of two alternatives of the diagonal mode, both alternatives allowing the use of the support structure even though the space is limited. Hence, there is a larger flexibility for using the support structure as described herein as compared with support structures according to the current state of the art.

In this disclosure, the term "proximal end" refers to an end of the support leg being closer to the vehicle as compared to a distal end when moving along the support structure. The support structure can be seen as a chain of connected links and when following that chain, starting from the vehicle, the proximal end will be reached before the distal end. Moreover, the term "distal end" refers to an end of the support leg being more far away from the vehicle as compared with a proximal end when moving along the support structure. When following the chain, starting from the vehicle of links the distal end will be the end which is reached later than the proximal end. It shall understood that a lateral side of the support leg is a side along the longest extension of the support leg.

According to at least one example embodiment of the invention the vehicle may be for example a trailer or a train wagon.

According to at least one example embodiment of the invention the tunnel mode allows for another vehicle (such as its loading platform) to be arranged underneath the support beam. This mode allows for moving a container or other storage unit from the vehicle comprising the support structure to that other vehicle.

According to at least one example embodiment of the invention the support leg is substantially straight. In such an embodiment the knee is situated where the support leg and the support beam are connected to each other. Hence, when the knee is positioned on a surface on which the vehicle stands a restable surface of the support structure may be a distal end of the support beam and/or a proximal end of the support leg.

According to at least one example embodiment the support leg comprises a foot arranged at a distal end of the support leg. The foot may be connected to the support leg via a spring. The spring keeps the foot in a position during e.g. transportation or when the support structure is in the diagonal mode.

According to at least one example embodiment of the invention the support leg comprises a first leg portion and a second leg portion, wherein said first leg portion and said second leg portion are in fixed angular relationship to each other, such that, a knee is formed between said first leg portion and said second leg portion wherein a proximal end of said first leg portion is connected to said support beam at a pivoting point, such that, said support leg is pivotable around said pivoting point relative to said support beam; and wherein in the tunnel mode, a distal end of said second leg portion is positioned to abut against a supporting surface on which the vehicle stands; and wherein in the diagonal mode, said knee of the leg or at least a part of a lateral side of said second leg portion is positioned to abut against the supporting surface on which the vehicle stands.

According to at least one example embodiment of the invention a front side of said knee comprises a slanted surface relative said first leg portion and/or said second leg portion such that said knee comprises a flat surface. The front surface of the knee is to be understood as being on a side opposite to the back surface of the knee. In the tunnel mode the front side of the knee is the side which is directed away from the vehicle. In the tunnel mode the front surface of the knee is located further away (distally) from the vehicle compared to the back surface of the knee which is located closer to the vehicle, as seen in the lateral direction from the vehicle. Typically, the back surface may be connected to said actuating device, which is reflected in at least one example embodiment.

The flat surface makes the knee to be a restable part of the support structure at least when the support structure is arranged in the diagonal mode. The flat surface of the knee may provide a more stable support structure since the support structure does not have to balance on e.g. a corner.

According to at least one example embodiment of the invention the slanted surface is arranged in an angle within the range of 10-80 ° to the first and/or the second leg portion.

According to at least one example embodiment of the invention said actuating device is connected to the support leg at a back side of said knee.

According to at least one example embodiment the back side of the knee is the side directed towards the vehicle at least when the support structure is arranged in the tunnel mode. By being connected to the backside of the knee the connection point will not hinder any use of the front side of the knee as a restable or abutting surface.

According to at least one example embodiment of the invention said pivoting point is a first pivoting point and wherein said support beam is connectable to said crane base at a second pivoting point being laterally displaced from a longitudinal center line of said vehicle.

By have both a first and a second pivoting point the direction of both the support beam and the support leg can be change independent of each other. This allows for the different modes, i.e. the tunnel mode, the diagonal mode and also, a raised support mode.

According to at least one example embodiment of the invention said second pivoting point is located in proximity to a lateral edge of said vehicle.

By having the second pivoting point located in a proximity to a lateral edge of the vehicle it is possible to arrange the support structure such that the knee is placed on the ground. Hence, the proximity to a lateral side makes the knee one of the possible abutment surfaces of the support structure. By using the knee as one of the abutment surfaces the support structure extends from the vehicle a shorter distance in the lateral direction than if supported by a distal end (e.g. distal end of a leg portion) of the support structure. This allows for using the support structure even if the space, i.e. the free distance besides the vehicle, is limited, for example a narrow street if the vehicle is a trailer or a small railway yard if the vehicle being a train wagon.

According to at least one example embodiment of the invention the second pivoting point is arranged between 50 mm to 400 mm from the lateral edge of the vehicle, or the second pivoting point is arranged between 100 mm to 200 mm from the lateral edge of the vehicle.

According to at least one example embodiment of the invention said actuating device is a first actuating device and wherein the support structure further comprises a second actuating device connected to the support beam for pivoting said support beam relative to said vehicle.

According to at least one example embodiment of the invention the second actuating device allows for changing the direction of the support beam such that the support beam may be directed both downwards and upwards relative the ground. The support beam may also be horizontal relative the ground.

According to at least one example embodiment of the invention said support beam is pivoted relative to said vehicle by an adjustment of an extension of said second actuating device.

According to at least one example embodiment by decreasing the extension of the actuating device the support beam will be moved upwards away from the ground. By increasing the extension, the support beam will be moved downwards towards the ground.

According to at least one example embodiment of the invention said second leg portion is substantially parallel with a supporting surface (e.g. parallel with a horizontal line if the vehicle is not in a slope), when said support structure is arranged in the diagonal mode.

According to at least one example embodiment of the invention when the second leg portion is horizontal the support structure may rest on the second leg portion and hence only the edge of the knee is to abut the surface.

According to at least one example embodiment of the invention said support beam is angled down towards said surface on which the vehicle stands when said support structure is arranged in the diagonal mode.

According to at least one example embodiment of the invention the angle by which the support beam is angled towards the ground will decide if the flat surface of the knee or the second leg portion will be the restable surface of the support structure. In the latter case, only an edge portion of the knee, i.e. the interface to the second leg portion, will abut/rest against a supporting surface such as the ground.

According to at least one example embodiment of the invention, said actuating device is further configured to arrange said support structure in a raised support mode, wherein said support beam is angled up, away from a ground surface, such that the second leg portion is restable on a surface above the ground, such as a platform surface of another vehicle, when in the raised support mode.

The angle by which the support beam is angled away from the ground may be such that the first leg portion is substantially perpendicular to the surface above the ground.

It should be understood that the terms "tunnel mode", "diagonal mode" and "raised support mode" have been selected to convey a visual understanding of the different modes. However, the tunnel mode could instead be referred to as a first mode in which a distal end of said second leg portion is positioned to abut against a supporting surface; the diagonal mode could be referred to as a second mode in which said knee of the support leg is positioned to abut against the supporting surface; and the raised support mode could be referred to as a third mode in which said support beam is angled up, away from a ground surface, such that the second leg portion is restable on a surface above the ground, such as a platform surface of another vehicle.

According to at least one example embodiment of the invention said support beam and said second leg portion have a substantially perpendicular relationship, when said support structure is arranged in the tunnel mode.

According to at least one example embodiment of the invention said second leg portion has a profile that widens as seen in a direction towards said knee.

According to a second aspect of the invention a support structure for a vehicle is provided. The support structure for a vehicle is provided with a cargo crane. The support structure comprises:

a support beam connectable to said vehicle;

a support leg having a first leg portion and a second leg portion, wherein said first leg portion and second leg portion are in fixed angular relationship to each other, such that, a knee is formed between the first leg portion and the second leg portion;

wherein a proximal end of said first leg portion is connected to said support beam at a pivoting point, such that, said support leg is pivotable around said pivoting point relative to said support beam;

an actuating device connected to the support leg for pivoting said support leg relative to said support beam;

wherein said actuating device is configured to arrange said support structure in at least a tunnel mode and a diagonal mode, by adjusting an extension of said actuating device, such that:

in the tunnel mode, a distal end of said second leg portion is positioned to abut against a supporting surface; and in the diagonal mode, said knee of the support leg is positioned to abut against the supporting surface.

Effects and features of this second aspect of the present invention are largely analogous to those described above in connection with the first aspect of the invention. Embodiments mentioned in relation to the first aspect of the present invention are largely compatible with the second aspect of the invention.

According to a third aspect of the invention a vehicle having a support structure is provided, the support structure being a support structure according to any embodiment of the first aspect of the invention.

Effects and features of this third aspect of the present invention are largely analogous to those described above in connection with the first and the second aspect of the invention. Embodiments mentioned in relation to the first aspect of the present invention are largely compatible with the third aspect of the invention.

BRIEF DESCRIPTION OF THE DRAWINGS

The above objects, as well as additional objects, features and advantages of the present invention, will be more fully appreciated by reference to the following illustrative and non-limiting detailed description of example embodiments of the present invention, when taken in conjunction with the accompanying drawings, wherein:

FIG. 1-4 shows schematic views of the support structure arranged in different modes according to at least one embodiment of the invention;

FIG. 1 shows a schematic view of a support structure arranged in a tunnel mode;

FIG. 2b shows a schematic view of a support structure arranged in an more extended diagonal mode as compared with FIG. 2a;

FIG. 3 shows a schematic view of a support structure arranged in the raised support mode;

FIG. 4 shows a schematic view of a support structure in a resting mode;

DETAILED DESCRIPTION OF THE DRAWINGS

In the present detailed description, embodiments of the present invention will be discussed with the accompanying figures. It should be noted that this by no means limits the scope of the invention, which is also applicable in other circumstances for instance with other types or variants of support structures or other types of vehicles than the embodiments shown in the appended drawings. Further, that specific features are mentioned in connection to an embodiment of the invention does not mean that those components cannot be used to an advantage together with other embodiments of the invention.

Figure 1:
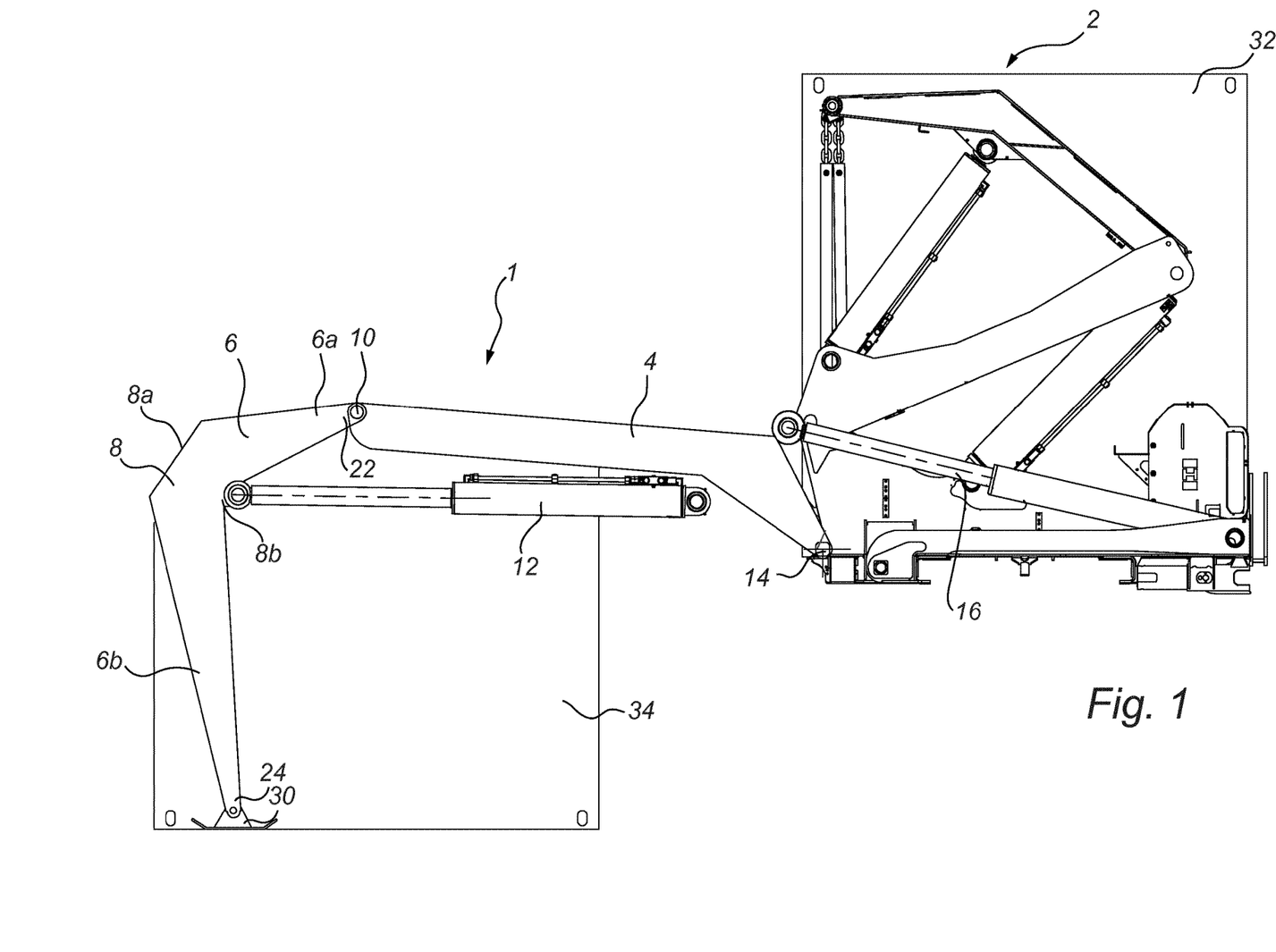

FIG. 1 shows the support structure 1 arranged in the tunnel mode. The support structure 1 for a vehicle provided with a cargo crane 2 comprises a support beam 4 connectable to said vehicle, a support leg 6 having a first leg portion 6a and a second leg portion 6b, wherein said first leg portion 6a and second leg portion 6b are in fixed angular relationship to each other, such that, a knee 8 is formed between the first leg portion 6a and the second leg portion 6b. The knee comprises a front side 8a and a back side 8b. The front side 8a of said knee 8 comprises a slanted surface relative the first leg portion 6a and/or the second leg portion 6b such that the knee 8 comprises a flat surface. The second leg portion 6b has a profile that widens as seen in a direction towards said knee 8. Moreover, the support structure 1 comprises a first actuating device 12 and a second actuating device 16. In addition, FIG. 1 shows a first container 32 and a second container 34. Moreover, the support structure comprises a foot 30 arranged on a distal end 24 of the second leg portion 6b.

The support structure 1 is arranged such that a proximal end 22 of the first leg portion 6a is connected to said support beam 4 at a first pivoting point 10, such that, the support leg 6 is pivotable around the first pivoting point 10 relative to the support beam 4. The actuating device 12 is connected to the support leg 6 for pivoting the support leg 6 relative to the support beam 4. More specifically the first actuating device 12 is connected to the support leg 6 at the back side 8b of the knee 8. The actuating device 12 is configured to arrange said support structure 1 in at least a tunnel mode and a diagonal mode, and suitably also in a raised support mode, by adjusting an extension of said actuating device 12. In FIG. 1 the tunnel mode is shown. The first container 32 is arranged on a vehicle (not shown) and the second container is arranged on the ground. The support structure 1 does stabilize the vehicle when the cargo crane 2 lifts a container from the position of the first container 32 and the second container 34.

Further, the support beam 4 is connected to a vehicle at a second pivoting point 14 being laterally displaced from a longitudinal center line of said vehicle; preferably the second pivoting point 14 is located in proximity to a lateral edge of the vehicle. Having the second pivoting point 14 located in proximity to a lateral edge of the vehicle makes it possible to arrange the support structure in a diagonal mode where the knee 8 reaches the ground surface (cf. FIG. 2a). The second actuating device 16 is connected to the support beam 4 for pivoting said support beam relative to said vehicle. The support beam 4 is pivoted relative to said vehicle by an adjustment of an extension of said second actuating device 16.

When in the tunnel mode, a distal end 24 of said second leg portion 6b is positioned to abut against a supporting surface. When the support structure 1 is arranged in the tunnel mode, another vehicle may be arranged underneath the support beam 4 and the first leg portion 6a. The support beam 4 and the first leg portion 6a are substantially horizontal whereas the second leg portion 6b is arranged substantially perpendicular to both the support beam 4 and the first leg portion 6a. Hence, the second leg portion 6b being vertical when the support structure 1 being in the tunnel mode.

Figure 2A:
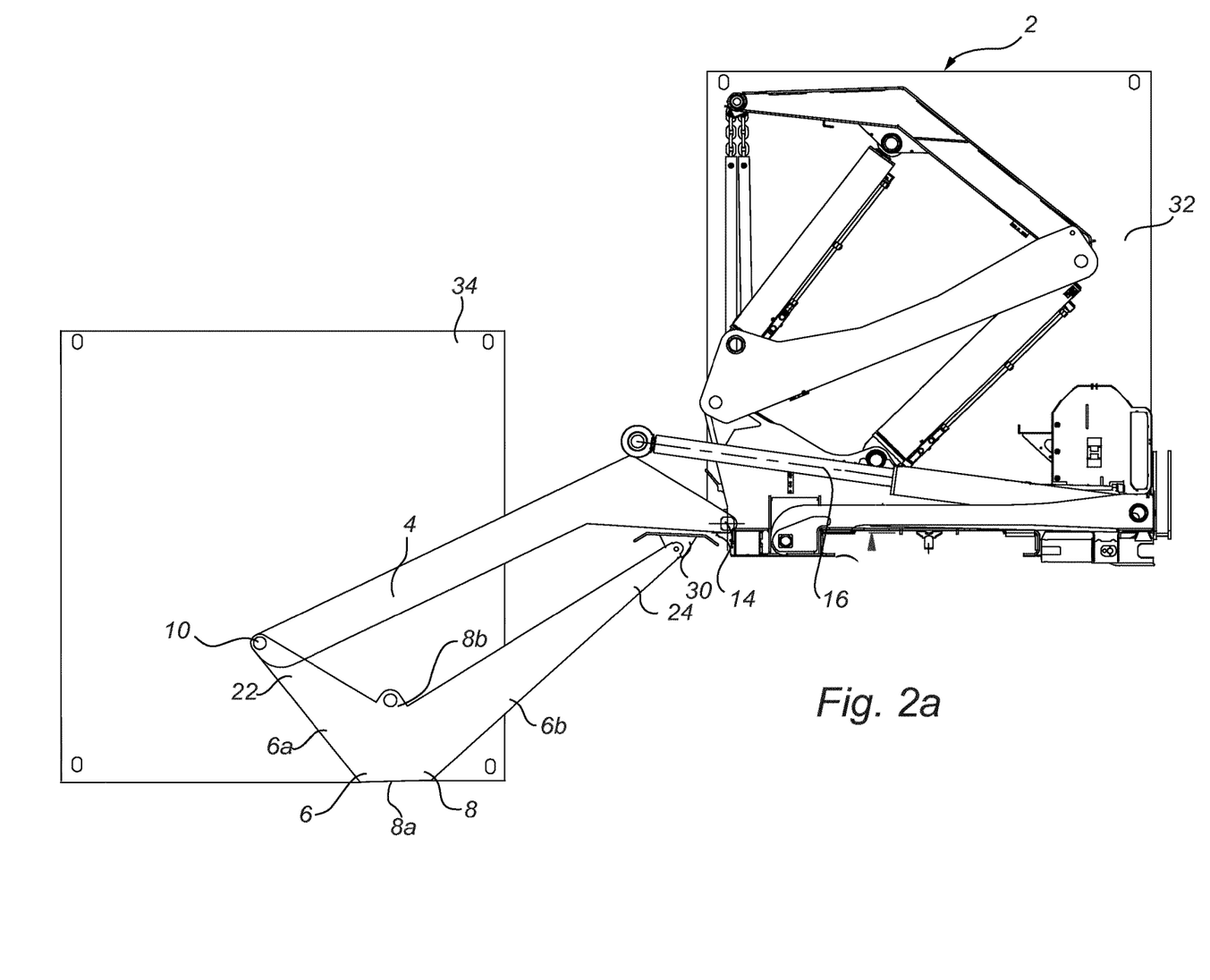
FIG. 2a shows a schematic view of a support structure arranged in a diagonal mode.

FIG. 2a shows the support structure 1 when arranged in the diagonal mode. The first actuating device is not shown in FIG. 2a due to clarity but please note that the support structure 1 comprises a first actuating device.

In the diagonal mode, the knee 8 of the support leg 6 is positioned to abut against the supporting surface. Hence, the flat, slanted surface of the front side 8a of said knee 8 abuts the supporting surface. The support beam 4 is angled down towards a ground surface when said support structure 1 is arranged in the diagonal mode. Here, the second leg portion 6b is substantially parallel with the support beam 4. The illustrated diagonal mode can be regarded as a relatively compact diagonal mode. A relatively extended diagonal mode is illustrated in FIG. 2b.

Figure 2B:
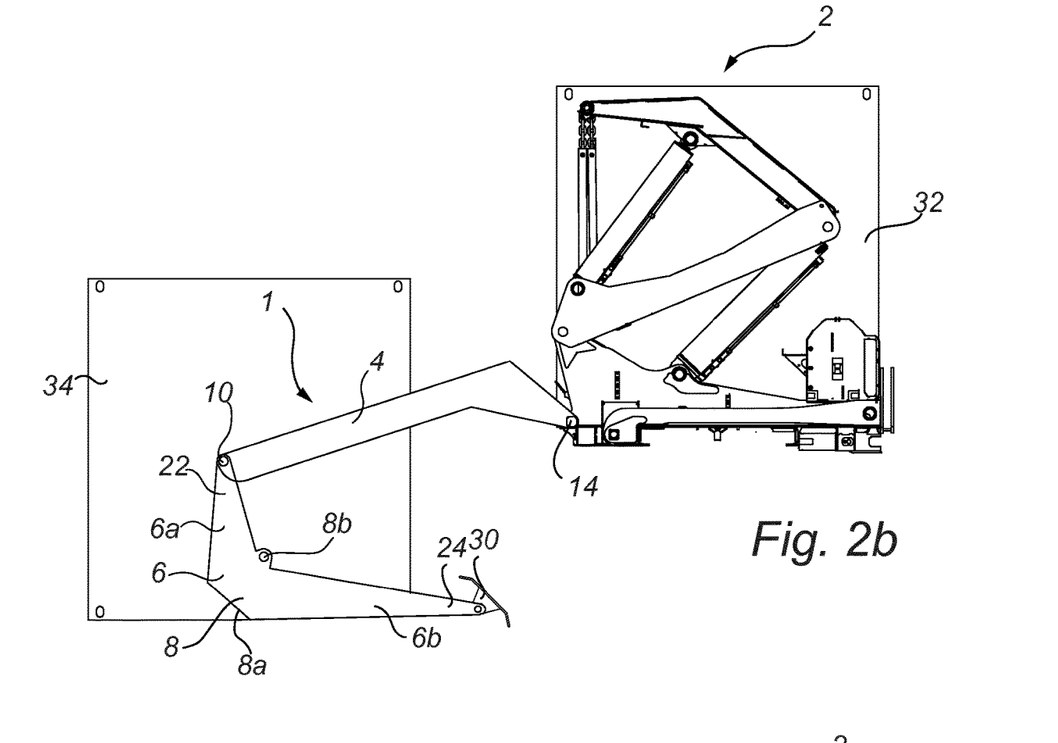

FIG. 2b shows the same support structure 1 as FIG. 2a. The first and second actuating devices are not shown in FIG. 2b due to clarity but please note that the support structure 1 comprises a first and a second actuating device. Here, the support structure 1 is arranged in the alternative, extended diagonal mode where the second leg 6b is positioned to abut against the supporting surface. Hence, the edge of the front side 8a of said knee 8 abuts the supporting surface. The second leg portion 6b is substantially parallel with a horizontal line in the alternative diagonal mode shown in FIG. 2b. In the extended diagonal mode (FIG. 2b), the support beam is not angled downwards as much as in the compact diagonal mode (FIG. 2a), and thus the support structure has a slightly larger lateral extension from the vehicle in the extended diagonal mode than in the compact diagonal mode.

Figure 3:
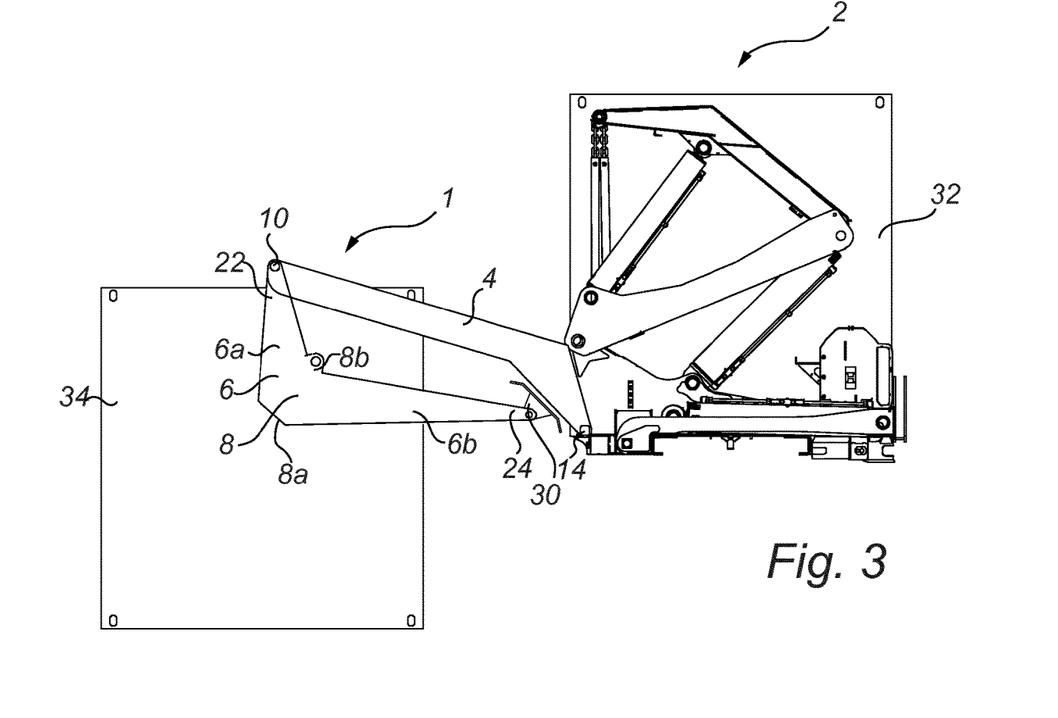

FIG. 3 shows the support structure 1 when arranged in the raised support mode. The first and second actuating devices are not shown in FIG. 3 due to clarity but please note that the support structure 1 comprises a first and a second actuating device.

When the support structure is arranged in the raised support mode the support beam 4 is angled up, away from said ground surface, such that the second leg portion 6b is restable on surface above the ground, e.g. another vehicle. Here, the second leg 6b is positioned to abut against the supporting surface. Hence, the edge of the front side 8a of said knee 8 abuts the supporting surface. The second leg portion 6b is substantially parallel with a horizontal line in the raised support mode as shown in FIG. 3.

Figure 4:
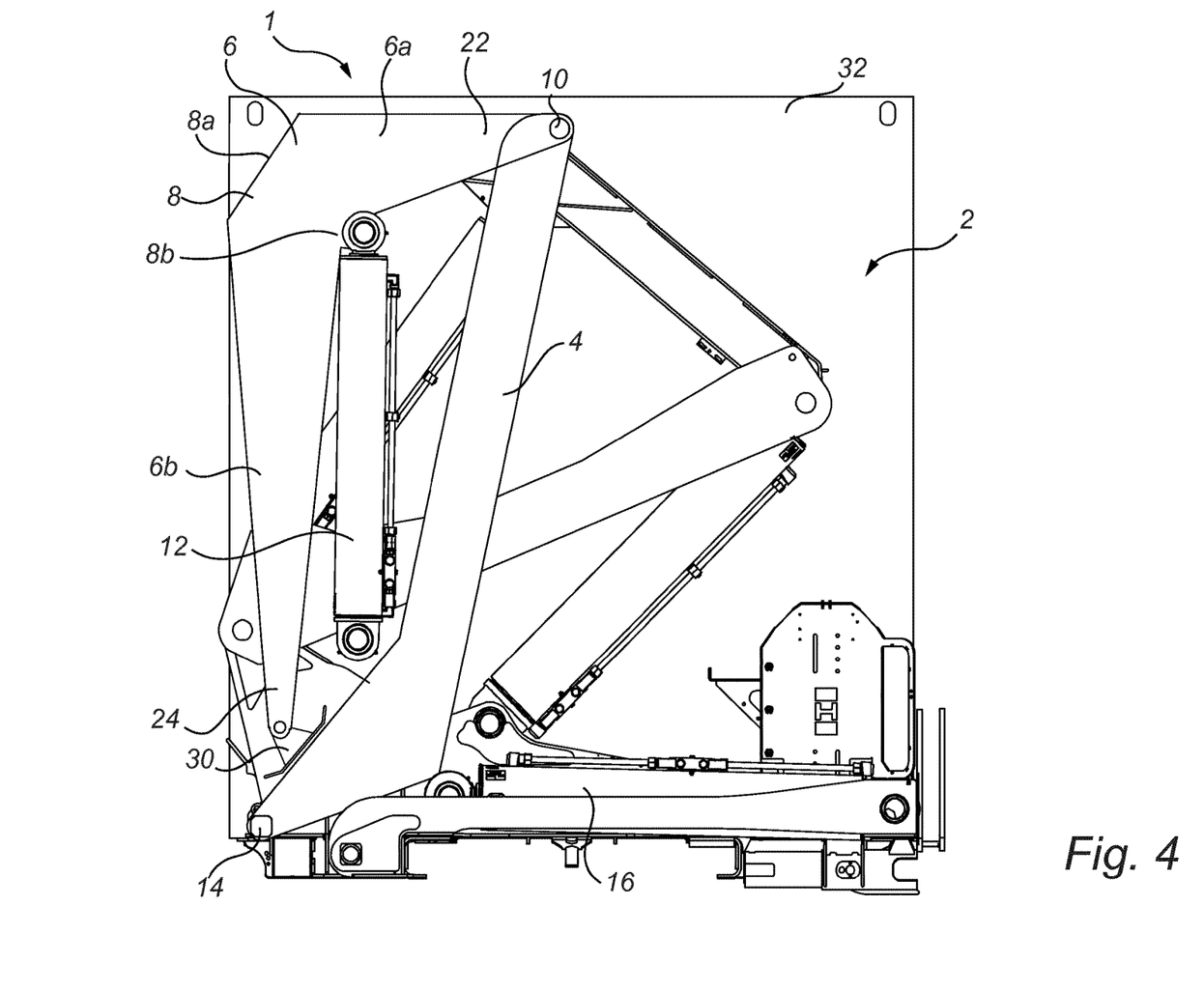

FIG. 4 shows the support structure 1 in a resting mode, i.e. how the support structure is arranged when not in use. The support beam 4 is arranged substantially vertical, the first leg portion 6a is arranged substantially horizontal and the second leg portion 6b is arranged substantially vertical. The distal end 24 of the second leg portion is close to the second pivoting point 14.

Figure 5:
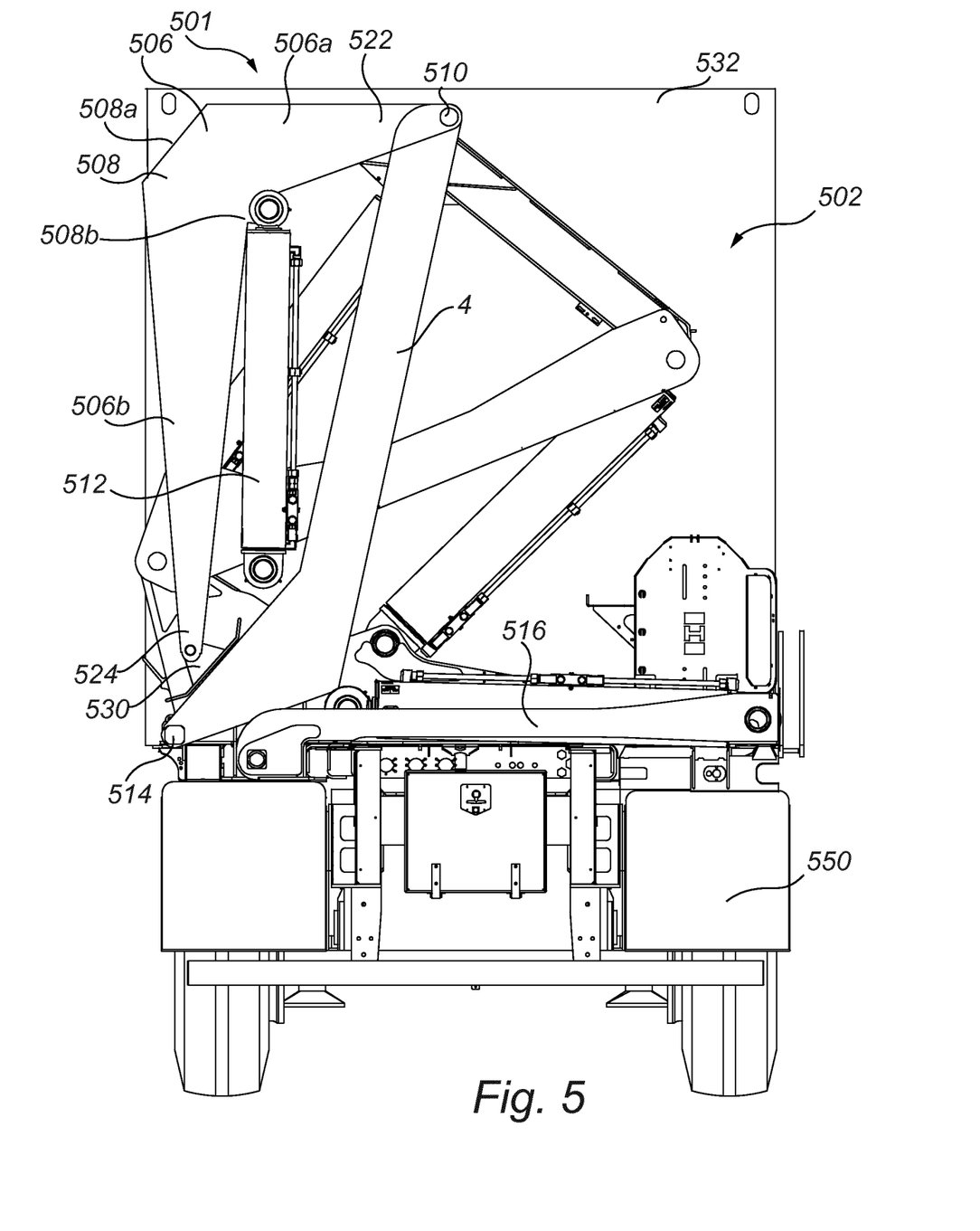
FIG. 5 shows a schematic view of a vehicle with a support structure in accordance with at least one embodiment of the invention.

FIG. 5 shows a vehicle which is provided with a support structure. The support structure 501 for a vehicle provided with a cargo crane 502 comprises a support beam 504 connectable to said vehicle, a support leg 506 having a first leg portion 506a and a second leg portion 506b, wherein said first leg portion 506a and second leg portion 506b are in fixed angular relationship to each other, such that, a knee 508 is formed between the first leg portion 506a and the second leg portion 506b. The knee comprises a front side 508a and a back side 508b. The front side 508a of said knee 508 comprises a slanted surface relative the first leg portion 506a and/or the second leg portion 506b such that the knee 508 comprises a flat surface. The second leg portion 506b has a profile that widens as seen in a direction towards said knee 508. Moreover, the support structure 501 comprises a first actuating device 512 and a second actuating device 516. In addition, FIG. 5 shows a container 532.

As the support structure 501 of FIG. 5 is the same as the support structure 1 in the resting mode of FIG. 4, but here the support structure 501 is arranged on a trailer 550. If standing behind the trailer 550 the support structure 501 is arranged in front of the container 532 which is arranged on the trailer 550.

The skilled person realizes that a number of modifications of the embodiments described herein are possible without departing from the scope of the invention, which is defined in the appended claims. For instance, there may be further alternatives to the diagonal mode and/or the raised support mode where other parts of the knee abut the ground surface. Moreover, the support structure may include a flat structure arranged on the distal end of the second leg portion, so that when the support structure is arranged in the tunnel mode, a more stable support structure may be achieved.

What is claimed is:
1. A support structure for a vehicle provided with a cargo crane having a crane base, said support structure comprising:
   a support beam connectable to said crane base;
   a support leg wherein a proximal end of said support leg is connected to said support beam at a pivoting point, such that, said support leg is pivotable around said pivoting point relative to said support beam;

an actuating device connected to the support leg for pivoting said support leg, relative to said support beam;

wherein said actuating device is configured to arrange said support structure in at least a tunnel mode and a diagonal mode, by adjusting an extension of said actuating device, such that:

in the tunnel mode, a distal end of said support leg is positioned to abut against a supporting surface on which the vehicle stands; and in the diagonal mode, a knee of the support structure or at least a part of a lateral side of said support leg is positioned to abut against the supporting surface on which the vehicle stands.

2. The support structure according to claim 1, wherein said support leg comprises a first leg portion and a second leg portion, wherein said first leg portion and said second leg portion are in fixed angular relationship to each other, such that, a knee is formed between said first leg portion and said second leg portion wherein a proximal end of said first leg portion is connected to said support beam at a pivoting point, such that, said support leg is pivotable around said pivoting point relative to said support beam; and wherein in the tunnel mode, a distal end of said second leg portion is positioned to abut against a supporting surface on which the vehicle stands; and wherein in the diagonal mode, said knee of the leg or at least a part of a lateral side of said second leg portion is positioned to abut against the supporting surface on which the vehicle stands.

3. The support structure according to claim 2, wherein a front side of said knee comprises a slanted surface relative said first leg portion and/or said second leg portion such that said knee comprises a flat surface.

4. The support structure according to claim 1, wherein said actuating device is connected to the support leg at a back side of said knee.

5. The support structure according to claim 1, wherein said pivoting point is a first pivoting point and wherein said support beam is connectable to said crane base at a second pivoting point being laterally displaced from a longitudinal center line of said vehicle.

6. The support structure according to claim 5, wherein said second pivoting point is located in proximity to a lateral edge of said vehicle.

7. The support structure according to claim 1, wherein said actuating device is a first actuating device and wherein the support structure further comprises a second actuating device connected to the support beam for pivoting said support beam relative to said vehicle.

8. The support structure according to claim 7, wherein said support beam is pivoted relative to said vehicle by an adjustment of an extension of said second actuating device.

9. The support structure according to claim 2, wherein said second leg portion is substantially parallel with the supporting surface, when said support structure is arranged in the diagonal mode.

10. The support structure according to claim 1, wherein said support beam is angled down towards said surface on which the vehicle stands when said support structure is arranged in the diagonal mode.

11. The support structure according to claim 1, wherein said actuating device is further configured to arrange said support structure in a raised support mode, wherein said support beam is angled up, away from a ground surface, such that the second leg portion is restable on a surface above the ground, such as a platform surface or another vehicle, when in the raised support mode.

12. The support structure according to claim 2, wherein said support beam and said second leg portion have a substantially perpendicular relationship, when said support structure is arranged in the tunnel mode.

13. The support structure according to claim 2, wherein said second leg portion has a profile that widens as seen in a direction towards said knee.

14. A vehicle having a support structure according to claim 1.

* * * * *